United States Patent
Lee et al.

(10) Patent No.: US 7,728,926 B2
(45) Date of Patent: Jun. 1, 2010

(54) LIQUID CRYSTAL DISPLAY AND METHOD FOR CONTROLLING BRIGHTNESS OF AN IMAGE

(75) Inventors: Jong-soo Lee, Cheonan-si (KR); Kun-ho Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 191 days.

(21) Appl. No.: 11/798,696

(22) Filed: May 16, 2007

(65) Prior Publication Data

US 2007/0290966 A1 Dec. 20, 2007

(30) Foreign Application Priority Data

Jun. 19, 2006 (KR) ...................... 10-2006-0055107

(51) Int. Cl.
*G02F 1/1335* (2006.01)
*G09G 3/36* (2006.01)

(52) U.S. Cl. ............................... 349/69; 349/70; 345/87

(58) Field of Classification Search ............. 349/69–71; 345/87–104

See application file for complete search history.

(56) References Cited

U.S. PATENT DOCUMENTS

| 6,839,042 B2 | 1/2005 | Conemac et al. |
| 2002/0135553 A1 | 9/2002 | Nagai et al. |
| 2004/0136204 A1 | 7/2004 | Asao |
| 2006/0002131 A1 | 1/2006 | Schultz et al. |
| 2007/0109463 A1* | 5/2007 | Hutchins ..................... 349/61 |

FOREIGN PATENT DOCUMENTS

| EP | 2001083510 | 3/2001 |
| JP | 02308218 | 12/1990 |
| JP | 2001 083510 | 3/2001 |
| WO | WO 2005/012788 A1 | 2/2005 |

* cited by examiner

*Primary Examiner*—Kevin S Wood
(74) *Attorney, Agent, or Firm*—Roylance, Abrams, Berdo & Goodman, LLP

(57) ABSTRACT

A liquid crystal display and method for controlling brightness of an image on a liquid crystal display are provided, in which, a liquid crystal display panel displays an image, a light generating unit provides a laser beam to illuminate the liquid crystal display panel, a scanning unit scans the liquid crystal display panel with the laser beam, and a controller controls a speed of the scanning unit depending on a brightness of the image. Thus, the liquid crystal display is capable of improving a contrast of an image displayed on a liquid crystal panel using a laser as a backlight.

26 Claims, 5 Drawing Sheets

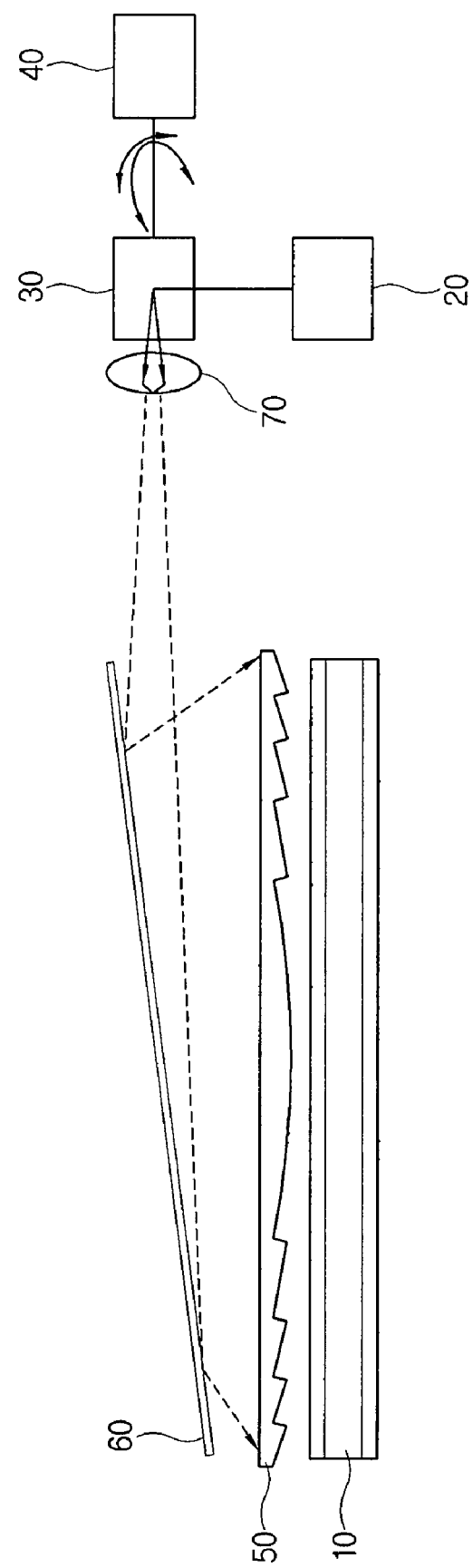

LIQUID CRYSTAL DISPLAY AND METHOD FOR CONTROLLING BRIGHTNESS OF AN IMAGE

CROSS-REFERENCE TO RELATED APPLICATIONS

This application claims the benefit under 35 U.S.C. §119(a) of Korean Patent Application No. 2006-0055107, filed on Jun. 19, 2006, the entire disclosure of which is hereby incorporated by reference.

BACKGROUND OF THE INVENTION

1. Field of the Invention

The present invention relates to a liquid crystal display. More particularly, the present invention relates to a liquid crystal display using a laser as a light source and a method for controlling brightness of an image on the liquid crystal display.

2. Description of the Related Art

Typically, a liquid crystal display (LCD) displays a desired image on a screen by adjusting transmittance of light supplied from a backlight unit to a liquid crystal display panel. The liquid crystal display panel has a plurality of liquid crystal cells arranged in a form of a matrix and a plurality of control switches that switch a video signal to be supplied to the liquid crystal cells.

FIG. 1 shows a backlight unit for a conventional LCD 10. As shown in FIG. 1, a backlight unit comprises a light source 1 that emits light, a lamp housing 2 that surrounds the light source 1, a light guiding plate 3 that transforms light incident from the light source 1 into planar light, a reflection plate 4 located below the light guiding plate 3 that reflects light traveling in lateral and bottom sides of the light guiding plate 3 toward a top side of the light guiding plate 3, a diffusion plate 5 that diffuses light passing through the light guiding plate 3, a brightness enhancement film (BEF) 6 that disperses light emitted from the diffusion plate 5 and shields a reflection pattern, and a dual brightness enhancement film (DBEF) 7 that converges an angle of light emission.

Such a backlight unit employing the above-mentioned light guiding plate has an uncompetitive price due to its outsourcing of parts and complexity of manufacture, and also has a problem in that light may be leaked if the lamp housing does not cover lamps properly, and brightness is lowered as light passes through the light guiding plate. A direct-below typed backlight unit has a defect in that many lamps and various sheets must be used for prevention of light loss and uniform diffusion of light.

In addition, since a light source such as a cold cathode fluorescent lamp (CCFL) must be always lighted, a contrast of an image may be lowered by some leaked light even in a complete black signal.

Accordingly, there is a need for an improved liquid crystal display and method for controlling brightness of an image on the liquid crystal display.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide the liquid crystal display and method for controlling brightness of an image on a liquid crystal display, which is capable of improving a contrast of an image displayed on a liquid crystal panel using a laser as a backlight.

The foregoing and/or other aspects of exemplary embodiments of the present invention can be achieved by providing a liquid crystal display, in which, a liquid crystal display panel displays an image; a light generating unit provides a laser beam to illuminate the liquid crystal display panel; a scanning unit scans the liquid crystal display panel with the laser beam; and a controller controls a speed of the scanning unit depending on a brightness of the image.

In an exemplary implementation, the controller controls the speed of the scanning unit and the laser beam intensity provided from the light generating unit, depending on the brightness of the image.

In another exemplary implementation, the light generating unit illuminates a rear side of the liquid crystal display panel.

In still another exemplary implementation, the liquid crystal display further comprises a polarizer changing a direction of the laser beam to travel perpendicular into the liquid crystal display panel.

In a further exemplary implementation, the light generating unit provides the laser beam as a visible ray.

In an exemplary implementation, the light generating unit changes the laser beam into a visible ray according to a nonlinear optical method.

In another exemplary implementation, the liquid crystal display further comprises a projection system that projects the laser beam in small beam size; and a mirror that reflects the laser beam projected through the projection system into the liquid crystal display panel.

The foregoing and/or other aspects of exemplary embodiments of the present invention can be achieved by providing a liquid crystal display, in which, a liquid crystal display panel displays an image; a light generating unit provides a laser beam to illuminate the liquid crystal display panel; a scanning unit scans the liquid crystal display panel with the laser beam; and a controller controls the laser beam intensity provided from the light generating unit depending on brightness of the image.

In another exemplary implementation, the light generating unit illuminates a rear side of the liquid crystal display panel.

In still another exemplary implementation, the liquid crystal display further comprises a polarizer changing a direction of the laser beam to travel perpendicular to the liquid crystal display panel.

In a further exemplary implementation, the light generating unit provides the laser beam as a visible ray.

In an exemplary implementation, the light generating unit changes the laser beam into a visible ray according to a nonlinear optical method.

In another exemplary implementation, the liquid crystal display further comprises a projection system that projects the laser beam in small beam size; and a mirror that reflects the laser beam projected through the projection system into the liquid crystal display panel.

BRIEF DESCRIPTION OF THE DRAWINGS

The above and other objects, features and advantages of certain exemplary embodiments of the present invention will be more apparent from the following description taken in conjunction with the accompanying drawings, in which:

FIG. 3 is a detailed control block diagram of the liquid crystal display panel according to an exemplary embodiment of the present invention;

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
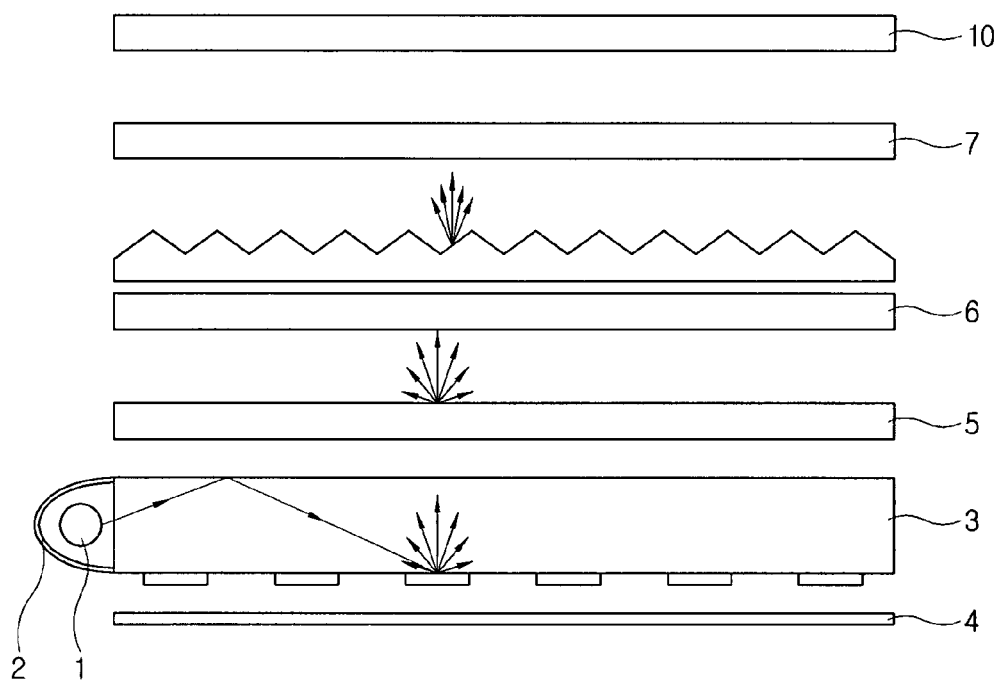
FIG. 1 is a control block diagram of a conventional liquid crystal display panel.
Figure 2:
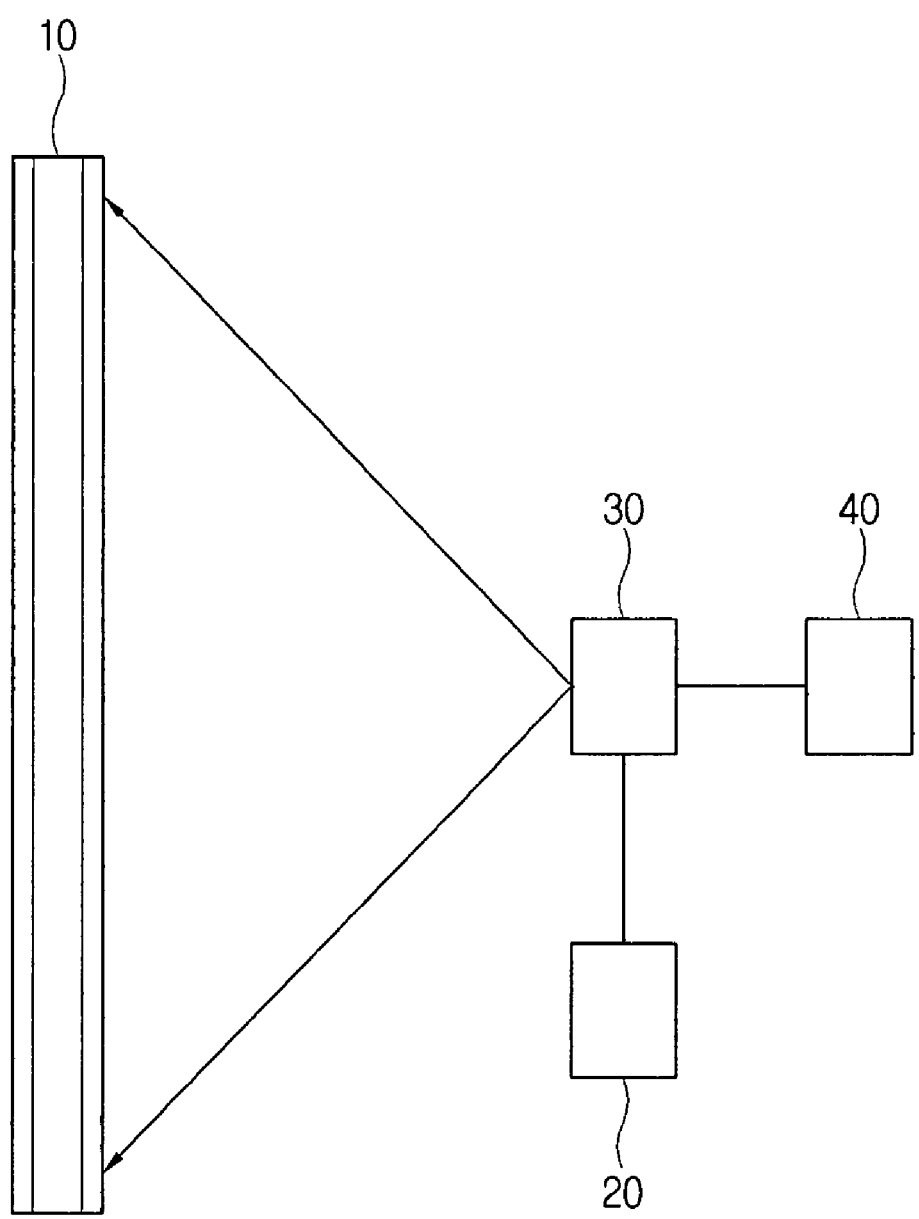
FIG. 2 is a control block diagram of a liquid crystal display panel according to an exemplary embodiment of the present invention.

FIG. 2 is a control block diagram of a liquid crystal display panel according to an exemplary embodiment of the present invention.

As shown in FIG. 2, a liquid crystal display according to an embodiment of the present invention comprises a liquid crystal display panel 10, a light generating unit 20, a scanning unit 30 and a controller 40.

The liquid crystal display panel 10 comprises a plurality of liquid crystal cells arranged in a form of a matrix and a plurality of control switches that switch a video signal to be supplied to the liquid crystal cells, and displays a desired image on a screen by adjusting transmittance of light supplied from a light source.

The light generating unit 20 generates a laser beam to illuminate the liquid crystal display panel. A principle of laser (Light Amplification by Stimulated Emission of Radiation) is as follows.

In an electron system having two vibration states in a material, electrons in a low energy level absorbs an energy proportional to its intensity, and electrons in a high energy level emit energy with the same phase. A laser amplifies and oscillates light using such stimulated emission of light. For example, the laser makes negative absolute temperature effectively by making the number of electrons having a high energy level larger than the number of electrons having a low energy level using a special method, and selectively amplifies an incident wave having a frequency that is equal to a resonance frequency of electrons. The laser has various characteristics depending on its type. For example, the laser may have three basic and common characteristics which are directivity, monochromatic, and coherency.

In an exemplary implementation, the light generating unit 20 emits a visible ray and provides a polarized laser beam having good directivity.

While moving from one side of the liquid crystal display panel 10 to the other side, the scanning unit 30 scans the liquid crystal display panel 10 with the laser beam having the directivity, which is generated from the light generating unit 20.

The controller 40 controls speed of the scanning unit 30. In an exemplary implementation, the controller 40 may control the speed of the scanning unit 30 according to brightness of an image to be displayed on the liquid crystal display panel 10. For example, when a portion of an image displayed on the liquid crystal display panel 10 is illuminated bright, the controller 40 increases the exposure amount of light by decreasing the speed of the scanning unit 30. Accordingly, an image of the liquid crystal display panel 10 at a portion at which the decreased speed of the scanning unit 30 is scanned is illuminated bright.

When a portion of an image displayed on the liquid crystal display panel 10 is illuminated dark, the controller 40 decreases the exposure amount of light by increasing the speed of the scanning unit 30. Accordingly, an image of the liquid crystal display panel 10 at a portion at which the increased speed of the scanning unit 30 is scanned is illuminated dark.

As shown in FIG. 3, the liquid crystal display of an exemplary embodiment of the present invention may further comprise a polarizer 50, a mirror 60 and a projection system 70.

The polarizer 50 polarizes the directive laser beam generated from the light generating unit 20 to have a constant direction. The polarizer 50 according to the present invention may be implemented by a Fresnel lens or other components having similar function.

The polarizer 50 adjusts direction of the laser beam emitted from the light generating unit 20 to be incident perpendicular to the liquid crystal display panel 10. Accordingly, a rear side of the liquid crystal display panel 10 may be perpendicularly scanned with the laser beam.

The mirror 60 with the projection system 70 (described later) may be used for reflecting the scanning beam of small beam size into the liquid crystal panel 10 to decrease a thickness of the liquid crystal display apparatus.

In an exemplary implementation, the mirror 60 may comprise a convex mirror to disperse the laser beam propagating with directivity for uniform illumination on the entire surface of the liquid crystal display panel 10.

The projection system 70 projects the laser beam of small beam size when the scanning unit 30 scans closely in the liquid crystal display. The laser beam projected through the projection system 70 is reflected by the mirror 60 located in the rear side of the liquid crystal display panel 10 to be incident into the liquid crystal display panel 10.

As an alternative, the light generating unit 20 may generate an infrared laser beam instead of the visible ray. In this case, to obtain the same effect as described above, it is possible to use a nonlinear optical method in which a fluorescent material such as phosphorus is applied on the rear side of the liquid crystal display panel 10 and a visible ray is emitted when the infrared laser beam emitted from the light generating unit 20 hits on the fluorescent material.

Figure 4A:
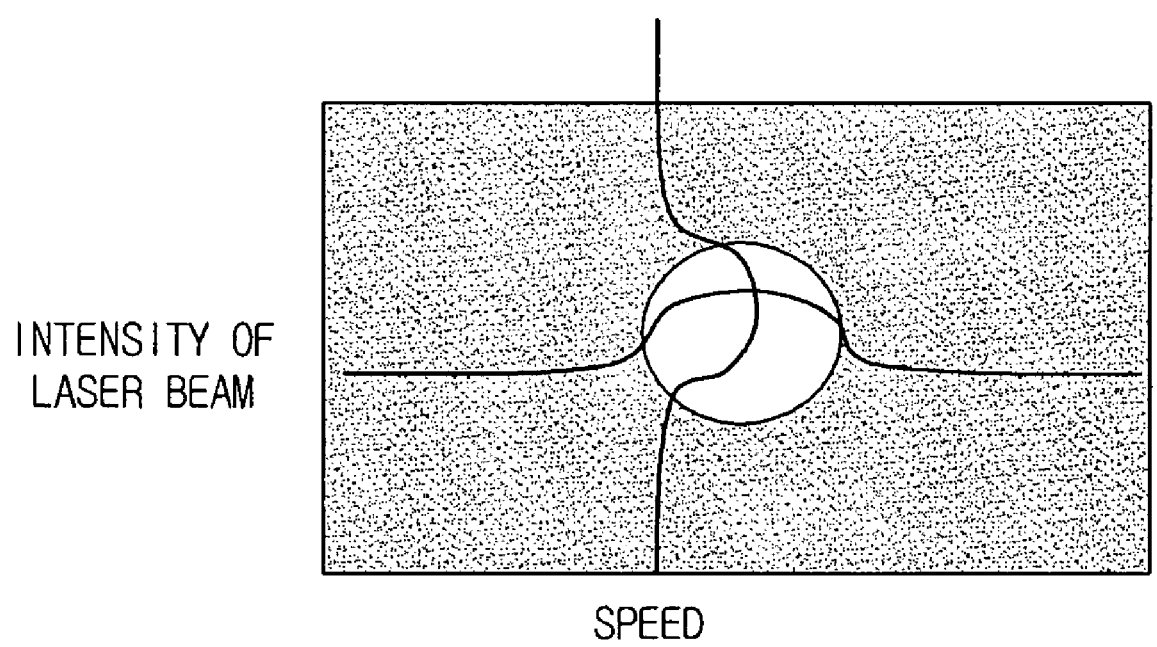
FIG. 4a is a view showing an example of a scanning method according to an exemplary embodiment of the present invention.

FIG. 4A is a view showing an example of a scanning method of the scanning unit 30 depending on the amount of light emitted from the backlight unit according to an exemplary embodiment of the present invention.

As shown in FIG. 4A, the controller 40 of the liquid crystal display may control the brightness of an image displayed on the liquid crystal display panel 10 by controlling the speed of the scanning unit 30, which is denoted by a horizontal axis, and the intensity of laser beam emitted from the light generating unit 20, which is denoted by a vertical axis.

In an exemplary implementation, the controller 40 controls movement of the scanning unit 30 such that the laser beam is exposed for a long time at a specified range by decreasing a scanning speed of the scanning unit 30 moving along the horizontal axis to illuminate a bright central portion shown in the figure. In addition, the controller 40 may control the light generating unit 20 to increase the amount of laser beam to illuminate the bright central portion.

Figure 4B:
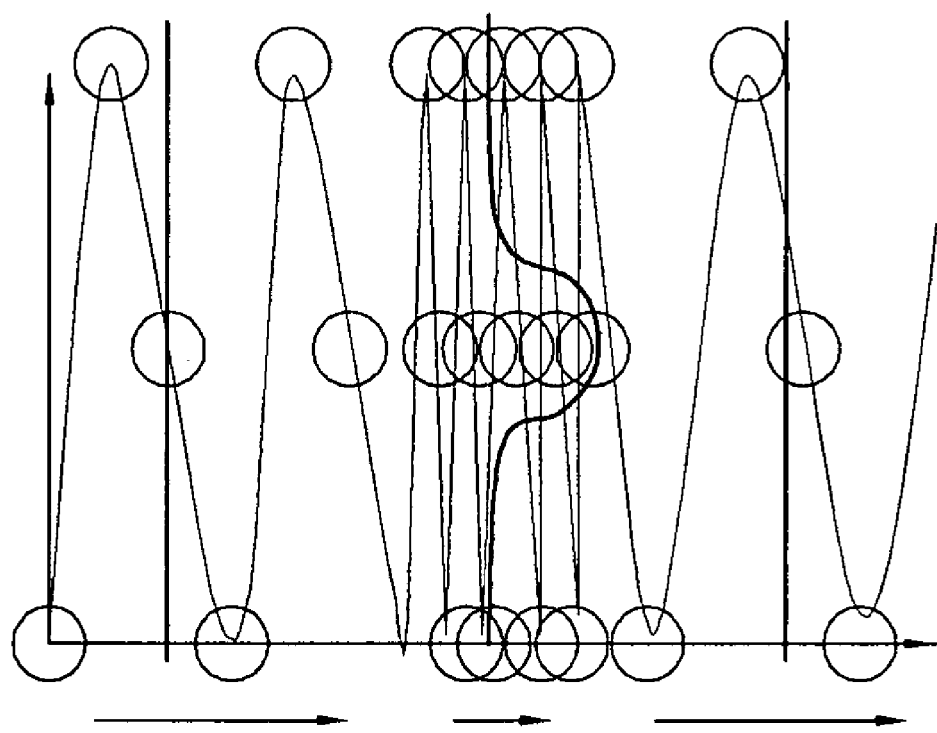
FIG. 4b is a view showing an example of a scanning order of a laser beam depending on a scanning region according to an exemplary embodiment of the present invention.

FIG. 4B is a view showing a scanning method of the scanning unit 30 according to an exemplary embodiment of the present invention.

As shown in the figure, the scanning unit 30 moving along a horizontal axis slows down its speed at a bright portion without changing the beam size, and then, the light generating unit 20 increases the laser beam amounts to illuminate the bright portion.

As an alternative, the controller 40 of the liquid crystal display may control the liquid crystal display panel 10 to be illuminated by controlling the intensity of laser beam emitted from the light generating unit 20 while maintaining the scanning unit 30 with constant speed. The more the light generating par 20 emits the laser beam, the brighter the liquid crystal display panel 10 is.

In the liquid crystal display described above, when the liquid crystal display panel 10 is scanned with a laser beam polarized depending on the speed of the scanning unit 30 and/or the amount of laser beam emitted from the light generating unit 20, light loss can be reduced as compared to when a CCFL is used as a light source, and an local dimming effect by modulation of laser beam can be obtained, which may result in improvement of a contrast of an image.

As apparent from the above description, the exemplary embodiments of the present invention provides a liquid crystal display, which is capable of increasing a contrast of an image displayed on a liquid crystal display panel by controlling brightness of the image depending on a moving speed of a scanning unit that scans the liquid crystal display panel with a laser beam.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A liquid crystal display comprising:
   a liquid crystal display panel for displaying an image;
   a light generating unit for providing a laser beam to illuminate the liquid crystal display panel;
   a scanning unit for scanning the liquid crystal display panel with the laser beam; and
   a controller for controlling a speed of the scanning unit in accordance with a brightness of the image,
   wherein the light generating unit changes the laser beam into a visible ray according to a nonlinear optical method, and
   wherein the nonlinear optical method comprises applying a fluorescent material on a rear side of the liquid crystal display panel and emitting the visible ray on the fluorescent material.

2. The liquid crystal display according to claim 1, wherein the controller controls the speed of the scanning unit and intensity of the laser beam from the light generating unit in accordance with the brightness of the image.

3. The liquid crystal display according to claim 2, wherein the light generating unit illuminates a rear side of the liquid crystal display panel.

4. The liquid crystal display according to claim 1, wherein the light generating unit illuminates a rear side of the liquid crystal display panel.

5. The liquid crystal display according to claim 2, further comprising a polarizer for changing a direction of the laser beam to travel perpendicular into the liquid crystal display panel.

6. The liquid crystal display according to claim 1, further comprising a polarizer for changing a direction of the laser beam to travel perpendicular into the liquid crystal display panel.

7. The liquid crystal display according to claim 2, further comprising:
   a projection system for projecting the laser beam in small beam size; and
   a mirror for reflecting the laser beam projected through the projection system into the liquid crystal display panel.

8. The liquid crystal display according to claim 1, further comprising:
   a projection system for projecting the laser beam in small beam size; and
   a mirror for reflecting the laser beam projected through the projection system into the liquid crystal display panel.

9. A liquid crystal display comprising:
   a liquid crystal display panel for displaying an image;
   a light generating unit for providing a laser beam to illuminate the liquid crystal display panel;
   a scanning unit for scanning the liquid crystal display panel with the laser beam; and
   a controller for controlling intensity of the laser beam provided from the light generating unit in accordance with brightness of the image,
   wherein the light generating unit changes the laser beam into a visible ray according to a nonlinear optical method, and
   wherein the nonlinear optical method comprises applying a fluorescent material on a rear side of the liquid crystal display panel and emitting the visible ray on the fluorescent material.

10. The liquid crystal display according to claim 9, wherein the light generating unit illuminates a rear side of the liquid crystal display panel.

11. The liquid crystal display according to claim 10, further comprising a polarizer for changing a direction of the laser beam to travel perpendicular to the liquid crystal display panel.

12. The liquid crystal display according to claim 9, further comprising:
   a projection system for projecting the laser beam in small beam size; and
   a mirror for reflecting the laser beam projected through the projection system into the liquid crystal display panel.

13. The liquid crystal display according to claim 2, wherein the fluorescent material comprises phosphorous.

14. The liquid crystal display according to claim 1, wherein the fluorescent material comprises phosphorous.

15. The liquid crystal display according to claim 9, wherein the fluorescent material comprises phosphorous.

16. A method for controlling brightness of an image on a liquid crystal display, the method comprising:
   providing a laser beam to illuminate a liquid crystal display panel;
   scanning the liquid crystal display panel with the laser beam;
   changing the laser beam into a visible ray according to a nonlinear optical method;
   controlling a speed of the scanning and intensity of the laser beam in accordance with a brightness of an image wherein the nonlinear optical method comprises applying a fluorescent material on a rear side of the liquid crystal display panel and emitting the visible ray on the fluorescent material.

17. The method of claim 16, further comprising changing a direction of the laser beam to travel perpendicular into the liquid crystal display panel.

18. The method of claim 16, further comprising illuminating a rear side of the liquid crystal display panel.

19. The method of claim 16, further comprising:
projecting the laser beam in a small beam size; and
reflecting the laser beam projected through a projection system into the liquid crystal display panel.

20. The method of claim 16, wherein the fluorescent material comprises phosphorous.

21. A liquid crystal display comprising:
a light generating unit for providing a laser beam to illuminate a liquid crystal display panel;
a scanning unit for scanning the liquid crystal display panel with the laser beam; and
a controller for controlling a speed of the scanning unit in accordance with a brightness of the image,
wherein the light generating unit changes the laser beam into a visible ray according to a nonlinear optical method, and
wherein the nonlinear optical method comprises applying a fluorescent material on a rear side of the liquid crystal display panel and emitting the visible ray on the fluorescent material.

22. The liquid crystal display according to claim 21, wherein the controller controls the speed of the scanning unit and intensity of the laser beam from the light generating unit in accordance with the brightness of the image.

23. The liquid crystal display according to claim 22, wherein the light generating unit illuminates a rear side of the liquid crystal display panel.

24. The liquid crystal display according to claim 21, further comprising a polarizer for changing a direction of the laser beam to travel perpendicular into the liquid crystal display panel.

25. The liquid crystal display according to claim 21, wherein the fluorescent material comprises phosphorous.

26. The liquid crystal display according to claim 21, further comprising:
a projection system for projecting the laser beam in small beam size; and
a mirror for reflecting the laser beam projected through the projection system into the liquid crystal display panel.

* * * * *